Dec. 16, 1969     E. S. BUZZELLI     3,484,296
LOW TEMPERATURE BATTERY
Filed Aug. 30, 1967
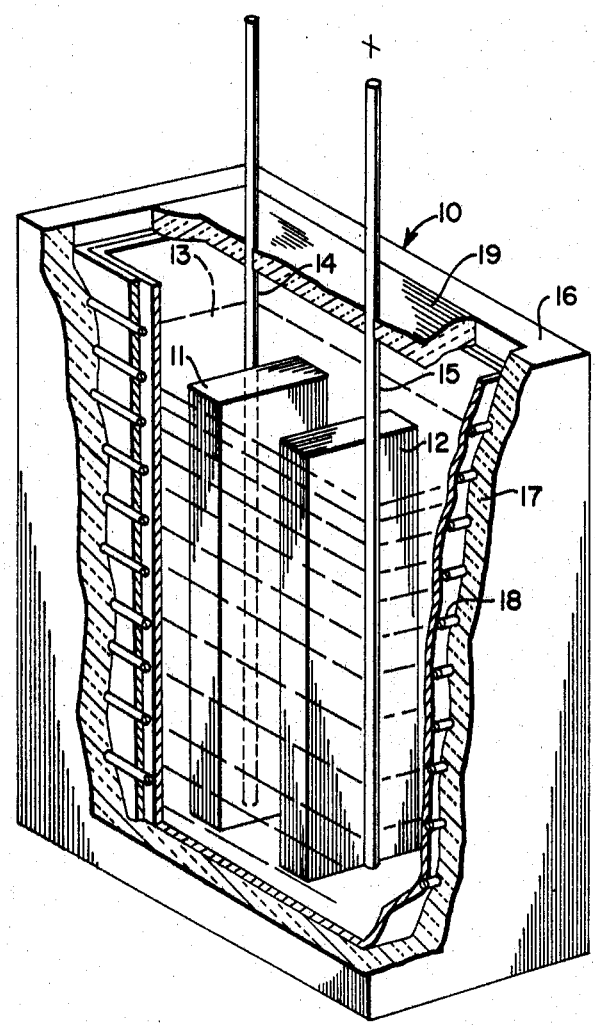
INVENTOR
EDWARD S. BUZZELLI
BY *Kramer & Sturges*
ATTORNEYS

United States Patent Office 3,484,296
Patented Dec. 16, 1969

3,484,296
LOW TEMPERATURE BATTERY
Edward S. Buzzelli, Solon, Ohio, assignor to The Standard
Oil Company, Cleveland, Ohio, a corporation of Ohio
Filed Aug. 30, 1967, Ser. No. 664,502
Int. Cl. H01m *17/02, 11/00*
U.S. Cl. 136—100                                    11 Claims

ABSTRACT OF THE DISCLOSURE

Low temperature energy storage device utilizing a non-aqueous metal cation ion-containing and conducting medium in combination with a negative electrode comprising an alkali metal common to the ion-containing and conducting medium and a dissimilar positive electrode.

BACKGROUND OF THE INVENTION

An electrical energy storage device is a combination of electrodes and ion-containing and conducting medium. Common low temperature secondary energy storage devices have generally included the well-known nickel-cadmium and lead-acid cells. Common low temperature primary energy storage devices have included the carbon-zinc, alkaline, and silver-oxide cells. These cells are commonly evaluated based on electrochemical capacity. Electrochemical capacity is determined in a secondary cell by charging and discharging the cell for a predetermined period of time.

The nickel-cadmium secondary cells, which utilize potassium hydroxide ion-containing and conducting medium and which are commercially available, range in nominal capacity ratings of from 5 to 20 watt hours per pound within a temperature range of about −20° C. to 45° C. Commercial demand for the nickel-cadmium battery has been strongest in the range of 2–4 ampere-hours for a 10-hour discharge. A cell of this nature ranges in weight from several ounces to a full pound and has utility over about a 300–1000 cycle life when cycling from fully charged to within 20 percent of a fully discharged condition, a cycle being a charge and a discharge.

The lead-acid secondary cell which utilizes sulphuric acid ion-containing and conducting medium is commonly used in automobiles and has a nominal capacity of about 14–18 watt hours per pound, depending, of course, on concentrations of active material and the like. The discharge curve for the lead-acid energy storage device slopes downwardly, with a slight plateau at about 2½ hours on a 5-hour discharge. The nickel-cadmium cell shows a curve which slopes downwardly with a plateau at about 4½ hours on a 10-hour discharge. The discharge curves of both cells (nickel-cadmium and lead-acid) plummet at the termination of the discharge period.

The primary cells generally display discharge characteristics represented by a curve which slopes downwardly without a plateau. For instance, at 500 milliamps discharge the alkaline-manganese cell is discharged from about 1.5 to 1.0 volt in about 20 hours, while the carbon-zinc cell of comparable size and under identical conditions is discharged in about 3½ hours. These are almost straight-line discharge curves with no plateaus. The discharge curves of the primary cell of this invention, besides discharging from a fully charged voltage of about 4 volts, is characterized by a curve sloping downwardly with at least one plateau.

Water is a limiting factor in these cells because the water decomposes at about 1.8 volts. Without water the limiting factor is still the ion-containing and conducting medium but the medium may have a much higher decomposition potential and consequently much higher energy storage capacity, since capacity is a function of the decomposition voltage squared.

Although the above-named cells, both primary and secondary, are commercially acceptable and are relatively economical to produce, they have their limitations in capacity and life. Thus, development work has proceeded to produce an improved cell. For instance, the patent to Mayer, Patent No. 3,032,600, describes a low-temperature cell of a cathode and an anode of an ion-exchange resin, and Panzer Patent No. 3,117,032 concerns itself with a non-aqueous ion-containing and conducting medium; specifically, amide solvents which are capable of dissolving various inorganic salts, exemplary of which are the sulfides, carbonates and halides of Groups I and II of the Periodic Table. The electrodes of Panzer are magnesium, calcium, cadmium, aluminum, nickel, iron or platinum. The Panzer cell is limited by the ion-containing and conducting medium because it is difficult to find an amide solvent which is utilizable over the low-temperature range of from about 0 to 125° C.

Also, another patent to Mayer, Patent No. 3,185,590, describes a cell comprising an ion-containing and conducting medium of a solvent of formamide, ether, pyridine, sulfoxide, nitrile, amine or amide and a solute of any useful metal. The cathode or Mayer's electron donor is an electron exchange resin. The anode or electron receiver is any convenient electropositive metal of less than about 70 equivalent weight, such as an alkali metal. However, even this cell lacks electrochemical capacity and will just compare with a nickel-cadmium cell.

Of the aforementioned conventional prior art cells, the nickel-cadmium cell is considered the most desirable as a secondary cell and the alkaline cell is considered most desirable as a primary cell for use in small appliances. They have been found particularly useful where energy is needed over short periods of time, such as in portable hand tools and appliances, shavers, toothbrushes, movie cameras, vacuum cleaners, tape recorders, radios, television sets, telephone amplifiers and the like. The secondary cell of the present invention has a potential capacity of about 80–150 watt hours per pound or about 8 times the capacity of the nickel-cadmium electric energy storage device, while the primary cell has a capacity about 6–8 times the capacity of the alkaline primary cell.

The cells of the present invention exhibit a substantially improved discharge curve. Thus, it is seen that the cell of the present invention has expectations which far exceed conventional energy storage devices.

DESCRIPTION OF THE INVENTION

By the present invention it has now been found that an improved electrical energy storage cell can be produced which cell utilizes a positive electrode or cathode and a negative electrode or anode and an ion-containing and conducting medium comprising a solvent and a solute which is a source of ions free to move in the transfer medium or solvent.

The solute preferably supplies alkali metal cations. The solute is, of course, miscible or dissolved in the solvent and has a common cation with the negative electrode. The common cation of the ion-containing and conducting medium is highly mobile for best results and of a size such that it can pass in and out of the negative electrode with a minimum of resistance. The solute is such that it does not attack the electrode material or be affected by it. In short, the solute is stable in its environment at operating temperatures and operating electrical potentials. Of course, since the cell of this invention is designed to operate at below about 125° C., and more specifically, at from about 0 to 80° C., and at ambient pressure, it is important that the solute and the solvent be such as to provide an ion-containing and conducting medium which is liquid under these conditions. Naturally, the solute must be of high purity.

The solutes which have been found to most nearly meet these requirements are the alkali metal halide salts. The cation moiety of the salt is selected from the group consisting of lithium, sodium, potassium rubidium, cesium and mixtures thereof. Double metal complexes may be used. In fact, for conductivity purposes, metal halides, e.g. aluminum chloride, are often complexed with the alkali halide. The halide moiety is selected from the group consisting of chlorine, fluorine, bromine, iodine and mixtures thereof. It is envisioned that double anion complexes could also be used. Examples of such solutes are lithium bromide, lithium chloride, lithium fluoride, sodium chloride, sodium fluoride and potassium chloride. Preferably, the ion-containing and conducting medium used is in a saturated or supersaturated condition. The ion-containing and conducting medium should have sufficient salt concentration to permit most economical operation of the cell. The ion-containing and conducting media having concentrations of solutes of less than about 0.5 molar are considered poor choices.

The choice of solvent of the ion-containing and conducting medium is dictated by many of the considerations involving the solute. The solvent of the ion-containing and conducting medium is any polar material which meets the requirements of serving as a transfer medium for the solute and which solute is miscible or dissolved by the solvent, yet of such a material as to be inert to the electrode materials. The solvent is preferably a liquid at from about 0–125° C., although operating conditions will dictate such a requirement. For example, dimethylsulfoxide is an excellent solvent above its melting point of about 18.5° C. The solvent is desirably one which does not readily release hydrogen ions. Solvents of high dielectric constants and low viscosity coefficients are preferred.

Suitable solvents are, for example, the nitriles such as acetonitrile, propionitrile, sulfoxides such as dimethyl-, diethyl-, ethyl methyl- and benzylmethylsulfoxide; pyrrolidones such as N-methyl-pyrrolidone and carbonates such as propylene carbonate. Of the suggested solvents the most desirable are as follows:

| Solvent | M.P., ° C. | Boiling point, ° C. | Vapor pressure 120° C. mm. Hg | Dielectric constant | Density |
|---|---|---|---|---|---|
| Acetonitrile | −41 | 81.6 | 6.5 | 39 | .78 |
| Propylene carbonate | −70 | 240 | 0.1 | 69 | 1.20 |
| Dimethyl formamide | −61 | 153 | | | 0.94 |
| Dimethyl sulfoxide | 18.5 | 83 | 0.5 | 45 | 1.10 |

Water is eliminated from the cell by every means possible. However, since trace amounts are unavoidable, the amount of water should be kept below about 0.1 weight percent based on total weight of ion-containing and conducting medium. Because the cell as described herein is not limited by water, it has a much higher decomposition potential. The decomposition potential is that of the solute, e.g. lithium bromide which has a decomposition potential of about 3.5 volts, or lithium chloride which has a decomposition potential of about 4.0 volts. Thus, since energy storage is a function of voltage squared, higher energy storage is now possible.

The electrodes are a relatively inert material which will not react with the solute or solvent. Of course, the electrodes are not dissolved by the ion-containing and conducting medium and retain their structural integrity under the most severe conditions of temperature and operation. Of course, the electrodes are conductors and are of a high enough melting point to withstand the temperatures generally associated with cells of this nature; that is, a melting temperature at least above the operating temperature of the cell.

The cathode or positive electrode is composed of an electro-positive material, in relation to the anode, which permits oxidation. The cathode is an electron acceptor and is formed from a material which is capable of storing the anion of the solute of lowest decomposition potential. The cathode can be composed of pure carbon or a metal-carbon matrix. Useful metals include tungsten, chromium, molybdenum and tantalum. The metal can be present in such electrodes in amounts of 5–98 weight percent based on total electrode weight.

The metals maintain their structural integrity over an infinite number of cycles in the cell herein described. Initially, the metal electrode can be composed of the metal alone or the metal combined in a compound form such as for example selected metal halides. In operation the metal will most probably be present as the metal halide.

The anode or negative electrode contains as one chemical element a cation common to the component of the ion-containing and conducting medium with the lowest decomposition potential, such as, for example, magnesium and Group I-A metals such as lithium, potassium and sodium, preferred of which is lithium. Pure metal anodes, such as for example pure lithium or lithium clad on a copper or iron substrate, can be used. Because stability is important, alloys are practical. Lithium will readily alloy with aluminum, bismuth, antimony and indium. Because of its light weight, aluminum is preferably alloyed with the lithium.

The aluminum-lithium electrode can be produced by preparing a preformed alloy of aluminum and lithium or may be prepared electrochemically by charging an aluminum electrode in an ion-containing and conducting medium comprising disassociated lithium ions whereby lithium is diffused into the aluminum structure. The electrode comprises aluminum in amounts of from about 65 to 95 weight percent based on total electrode weight and from about 2 to 35 weight percent lithium based on total electrode weight. Commercial electrodes are available having about 16 weight percent lithium. Metallic impurities may be present in quantities of less than 10 weight percent. The aluminum-lithium electrode is capable of storing lithium metal of the ion-containing and conducting medium without becoming liquid. The electrode remains solid and is thus capable of diffusing the lithium through its structure. On charge, lithium metal enters the electrode structure and on discharge lithium metal leaves the electrode structure.

Conditioning of secondary cells prior to use is desirable. Conditioning not only helps to rid the electrodes of undesirable impurities but also helps develop porosity. The electrodes can be conditioned by slow charge and discharge over about 6 cycles.

The invention can be further described by referring to the drawing wherein the figure illustrates an energy storage device composed of the components of the present invention. Referring more particularly to the drawing there is shown a cell 10 of negative electrode 11 and positive electrode 12 positioned one from the other in spaced relationship with the ion-containing and conducting medium 13 intermediate thereof. Electrode 11 is fixedly attached to a steel current carrier 14 and electrode 12 is fixedly attached to a graphite current carrier 15 Both electrodes are immersed in the ion-containing and conducting medium held in a heat-resistant, noncorrosive container 16 which has been purged of air and replaced with a nonoxidizing gas. The container is sealed by an insulating cap 19 of for example lava or ceramic or of any other nonconducting material to maintain the electrodes apart from one another and suspended in the ion-containing and conducting medium of the sealed container. Within the walls of the container 16 is insulation 17 which may be any known insulation such as absestos or fiberglass. Optionally, throughout the walls of the housing are heating elements 18 to supply heat to the device, should such be needed.

The invention can be illustrated by the following examples:

EXAMPLE I

Ion-containing and conducting medium was prepared by dissolving 43.43 grams of lithium bromide (0.5 mole) in one liter of propylene carbonate. The lithium bromide was predried at 350° C. in an argon atmosphere for 2 hours. The propylene carbonate was treated with molecular sieves to lower the moisture content to 0.01 weight percent or less. Precautions were taken to maintain dryness during the mixing. Approximately 230 cubic centimeters of the propylene carbonate-lithium bromide ion-containing and conducting medium were placed in a beaker. The beaker contained 3 lithium-aluminum alloy anodes (negative) containing 16 weight percent lithium. Each electrode was held on a stainless steel rod current carrier. In this container was placed 4 electrodes for capacity evaluation as cathodes (positive). Three of the electrodes were carbon composites of tungsten, molybdenum and chromium, respectively, the metals being present in the amount of 50 weight percent based on total electrode weight. A fourth cathode consisted of a commercially available porous carbon FC–13 electrode (Pure Carbon Company).

The tungsten-molybdenum carbon composites and porous carbon cathodes had a volume of 0.063 cubic inch and the chromium-carbon cathode had a volume of 0.012 cubic inch. The electrodes were charged at a constant voltage for a predetermined time for 20 hours. Each electrode was discharged separately at a current of 4 milliamps. The capacity of the electrodes was found to be: tungsten carbon composite, 5.37 ampere hours per cubic inch; molybdenum carbon composite, 3.3 ampere hours per cubic inch; chromium carbon composite, 4.4 ampere hours per cubic inch; and FC–13 carbon, 1.17 ampere hours per cubic inch.

In determining the equivalent capacity per unit energy storage device, an energy storage device containing a tungsten carbon electrode would have 0.063 cubic inches of tungsten carbon cathode and in this example 0.10 cubic inches of aluminum-lithium anode or a total volume of 0.16 cubic inch of electrode. This would have a capacity of approximately 0.30 ampere hours or 1.9 ampere hours per cubic inch. If 1 cubic inch of ion-containing and conducting medium is added, the capacity would be 0.95 ampere hours per cubic inch of energy storage device without container. Since the average voltage of a cell is illustrated as 2.5 volts, this would have a capacity of 2.48 watt hours per cubic inch. With an average density of about 2 grams per cubic centimeter the capacity would be equivalent to about 40 watt hours per pound of electric storage device.

EXAMPLE II

An aluminum lithium electrode of 16 weight per cent lithium was used in an electrical energy storage cell. A pressed tungsten-carbon plate was used as the cathode. The cathode plate contained 55–58 weight percent tungsten. The ion-containing and conducting medium was a mixture of 1 M LiBr/dimethyl formamide and 0.8 M LiBr/acetonitrile. The cell was charged on numerous occasions at a constant voltage of 4 volts for from 1 to 21 hours while sweeping the current during the charging time from 400 milliamps to 10 milliamps. The cell was discharged after each charge at a constant current discharge of from 10 to 50 milliamps. The operation of the cell was entirely satisfactory on charge and discharge, showing that cells of combined solvents can be utilized.

EXAMPLE III

A primary electrical energy storage device was constructed utilizing a cathode of tungsten hexachloride ($WCl_6$) enclosed in a carbon felt bag, an anode of lithium metal clad on a copper substrate, and both electrodes immersed in an ion-containing and conducting medium of 1 M LiCl/propylene carbonate with a paper towel spacer contiguous with and between the anode and cathode. The cell contained about 10.0 gram ion-containing and conducting medium; 0.60 gram lithium; 0.57 gram felt bag; 2.0 gram $WCl_6$; 2.45 grams anode; and 0.22 gram spacer.

The cell thus constructed had a satisfactory discharge curve showing high capacity.

The terms cell and energy storage device have been used herein interchangeably although it is recognized that an energy storage device is generally considered an assemblage of cells.

What is claimed is:

1. An electrical energy storage device comprising (a) an alkali metal negative electrode, (b) a positive electrode comprising tungsten, chromium, molybdenum or tantalum or the halides of any of these metals, and (c) an electrolyte comprising a solution of an alkali metal halide in an organic solvent.

2. An electrical energy storage device as in claim 1 characterized further in that the negative electrode is a lithium-containing electrode.

3. An electrcal energy storage device as in claim 1 characterized further in that the positive electrode is a tungsten-containing electrode.

4. An electrical energy storage device as in claim 1 characterized further in that the positive electrode is tungsten.

5. An electrical energy storage device as in claim 1 characterized further in that the positive electrode is a tungsten halide.

6. An electrical energy storage device as in claim 1 characterized further in that the positive electrode is tungsten hexachloride.

7. An electrical energy storage device as in claim 1 characterized further in that the electrolyte is a solution of a lithium halide in an organic solvent.

8. An electrical energy storage device as in claim 1 characterized further in that the electrolyte is a solution of an alkali metal halide-aluminum halide complex in an organic solvent.

9. An electrical energy storage device as in claim 1 characterized further in that the electrolyte is a solution of a lithium halide in propylene carbonate.

10. An electrical energy storage device as in claim 1 characterized further in that the anode is an alkali metal electrode, the cathode is a tungsten-containing electrode and the electrolyte is a solution of a halide of the alkali metal of the anode in an organic solvent.

11. An electrical energy storage device as in claim 1 characterized further in that the anode is lithium, the cathode is a tungsten-containing electrode and the electrolyte is a solution of a lithium halide in an organic solvent.

References Cited

UNITED STATES PATENTS

| | | | |
|---|---|---|---|
| 2,566,114 | 8/1951 | Bloch | 136—6.15 |
| 3,043,896 | 7/1962 | Herbert et al. | 136—6 |
| 3,093,514 | 6/1963 | McCallum et al. | 136—100 |
| 3,098,770 | 7/1963 | Horowitz et al. | 136—100 |
| 3,117,032 | 1/1964 | Panzer | 136—100 |
| 3,185,590 | 5/1965 | Mayer et al. | 136—6 |
| 3,236,694 | 2/1966 | Stenger et al. | 136—100 |
| 3,248,265 | 4/1966 | Herbert | 136—100 |
| 3,255,043 | 6/1966 | Bettman | 136—83 |
| 3,268,365 | 8/1966 | McQuade et al. | |
| 3,279,952 | 10/1966 | Minnick | 136—83 |
| 3,393,093 | 7/1968 | Shaw et al. | 136—6 |

WINSTON A. DOUGLAS, Primary Examiner

C. F. LEFEVOUR, Assistant Examiner

U.S. Cl. X.R.

136—120, 155